June 14, 1938.  A. LAUTERBACH  2,120,334
FISHING REEL
Filed April 29, 1937  2 Sheets-Sheet 1
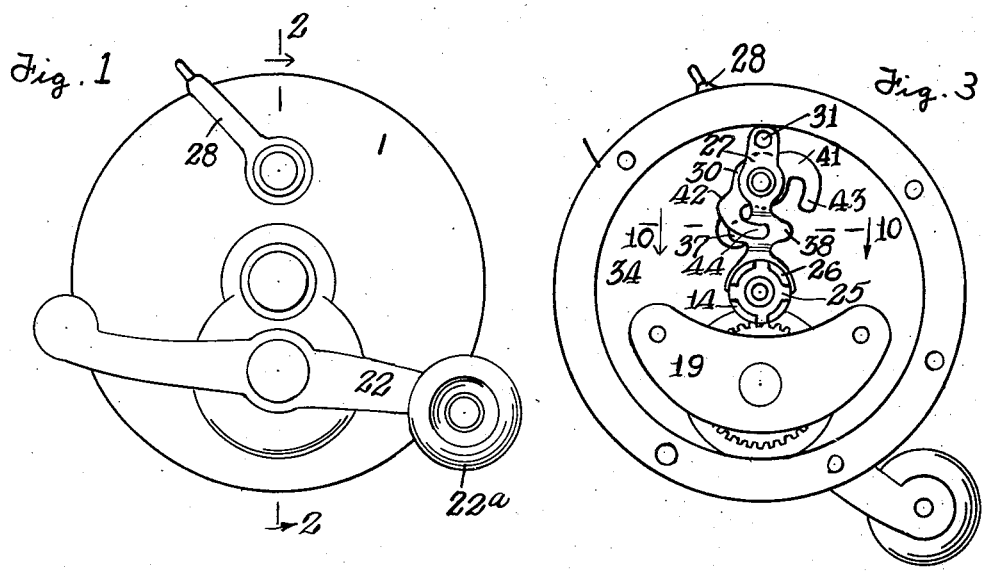
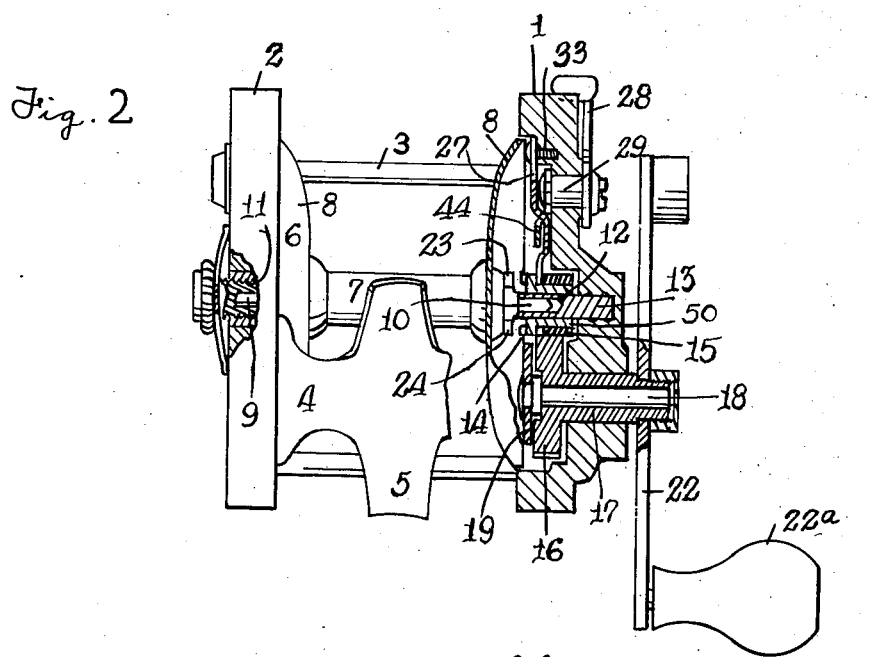
INVENTOR
Alexander Lauterbach
BY Martin & Rendell
ATTORNEYS June 14, 1938.  A. LAUTERBACH  2,120,334
FISHING REEL
Filed April 29, 1937  2 Sheets-Sheet 2
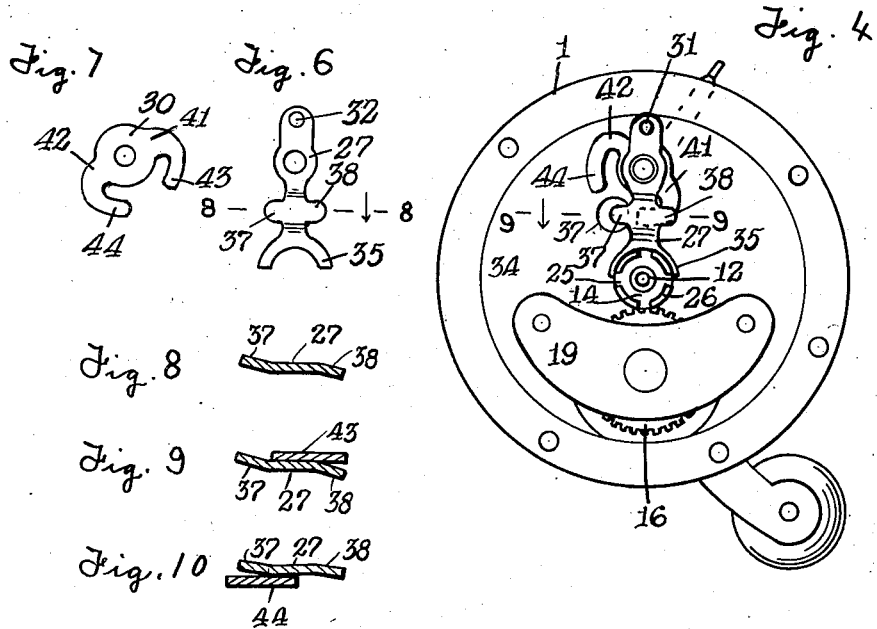
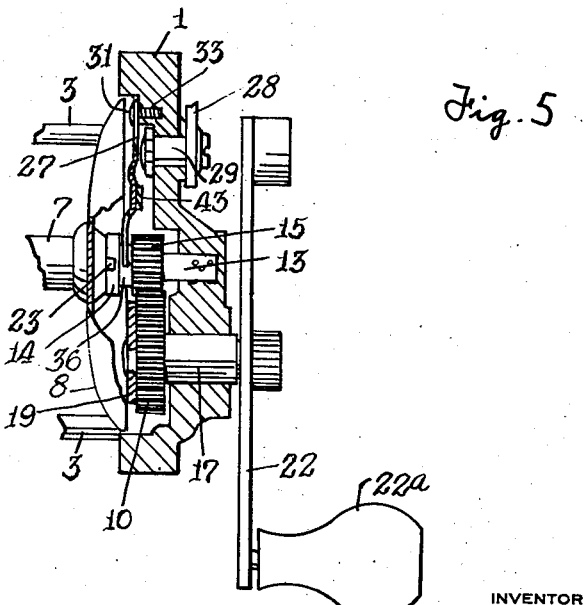
INVENTOR
Alexander Lauterbach
BY Martin & Rendell
ATTORNEYS Patented June 14, 1938

2,120,334

UNITED STATES PATENT OFFICE 2,120,334

FISHING REEL

Alexander Lauterbach, Washington Mills, N. Y., assignor to Horrocks-Ibbotson Company, Utica, N. Y., a corporation of New York Application April 29, 1937, Serial No. 139,750

2 Claims. (Cl. 242—84.7)

My present invention relates to fishing reels and more particularly to the type known as free spool reels.

The purpose of this invention is to provide a fishing reel of new and improved construction which is simple and strong in construction, durable and reliable in operation and having means for positively throwing the clutch mechanism into engagement and for positively throwing the clutch mechanism out of operation.

Further purposes and advantages will appear from the specification and claims herein.

Fig. 1 is a side view of a fishing reel embodying this invention and showing the side having the head plate to which the crank handle and the operating lever for moving the clutch-shifting arm are attached, said operating lever being in the position it occupies when the clutch members are in engagement.

Fig. 2 is a view partly in cross section on line 2—2 of Fig. 1 and partly in elevation, the clutch being disengaged.

Fig. 3 is a side elevation of the inner side of the head plate carrying the movable clutch member, the clutch being disengaged.

Fig. 4 is a side elevation similar to Fig. 3, but showing the parts in the position they occupy when the clutch is engaged.

Fig. 5 is a cross sectional view of the right hand head plate showing the parts in the position they occupy when the clutch is engaged.

Fig. 6 is a plan view of the clutch shifting arm 27.

Fig. 7 is a plan view of the C-shaped cam plate 30.

Fig. 8 is a cross sectional view on line 8—8 of Fig. 6.

Figs. 9 and 10 are respectively cross-sectional views on line 9—9 of Fig. 4 and on line 10—10 of Fig. 3 showing the relative position of the clutch-shifting arm and two separate fingers upon the C-shaped cam plate.

Referring to the drawings in a more particular description, it will be seen that the fishing reel to which this invention is applied includes two head plates 1 and 2 connected in the usual manner by several small cross bars 3 and a wider cross member 4 having the base 5 by means of which the reel as a whole is mounted upon the butt end of the fishing rod. As this reel is assembled and illustrated the head plate 1 is the right hand plate as seen in Fig. 2 and the head plate 2 is the one at the left of said figure. Revolubly mounted between these two plates there is located the reel spool 6 having hub 7 and side plates 8 mounted as flanges near the end of the hub.

On the left end of the hub is a spindle 9 mounted in a bearing 11 in the head 2 allowing free rotation as far as that end of the spool is concerned. On the right hand end of the hub as seen in Fig. 2 there is provided an outwardly projecting spindle 10 extending into a bearing 12 provided upon the right hand head plate 1 and consisting of the central bore in a hollow stub shaft 13 fixedly secured upon and projecting inwardly from the head plate 1. On this stub shaft is slidingly mounted as one unit the longitudinally movable clutch member 14 and a broad-faced pinion 15 either by said parts 14 and 15 being made integral or as shown in Fig. 2 of the drawings by said clutch member having a sleeve 50 extending to the right as seen in Fig. 2 from the clutch member and having its central bore of the same diameter as the bore of the clutch member 14. Upon the outside of this sleeve and slightly spaced from the body of the clutch member itself there is located the broad-faced pinion 15 which is suitably fixed upon said sleeve of the clutch member so that the said clutch member and pinion will revolve together upon the said stub shaft 13 and will slide together longitudinally of said stub shaft for limited movement.

The pinion 15 is at all times in mesh with gear 16 fixedly mounted upon the hollow rotated shaft 17 which projects through the head plate 1 and at its outer end has secured thereto the crank handle 22 having at one end the loose knob 22—a whereby in an obvious manner rotation of the crank handle imparts a reverse rotating movement to the pinion 15. Outwardly from the gear 16 the shaft 17 runs through a relatively long bearing and the inner end of the said shaft is suitably revolubly supported as by a post 18 provided upon the outer face of a bridge plate 19 conveniently of crescent form as plainly seen in Fig. 3 which plate has its opposite ends supported by piers extending inwardly from the head plate 1.

At the right hand end of the hub 7 of the spool there is provided the other clutch member 23 which hereafter will be called the fixed clutch member in the sense that while it rotates with the hub and so with the spool, it does not move lengthwise of the axis of the spool. Conveniently this fixed clutch member is composed of two radially arranged jaws 24 preferably arranged in line with each other on the opposite sides of the spindle 10 and adapted to enter either pair of oppositely disposed recesses 25 on the sliding or movable clutch member 14. These recesses 25 on this clutch member are conveniently provided or formed by the spacing apart of oppositely disposed jaws 26 on the inner face of the sliding clutch member as will be plainly seen in Fig. 3. Preferably there will be four such jaws spaced apart in the several quarters upon the inner face of the said movable clutch member and so providing two pairs of recesses 25 into either pair of which the jaws 24 upon the fixed clutch may enter when the movable or sliding clutch is moved inwardly. Such engagement as is common with such opposing jaw clutch members may take place instantly if the jaws upon the movable clutch are in line with either pair of recesses upon the movable clutch when the movable clutch member is moved sufficiently towards the other member. If the jaws are not then in line with the recesses a slight amount of rotating movement of either clutch member will allow the clutch members to move into engagement. Upon the movable clutch member being moved away from the fixed clutch member the parts will be disengaged.

The means for so moving the sliding clutch member into engagement or out of engagement with the fixed clutch member consists of a clutch shifting arm 27 and the means for so shifting said arm consisting of the operating lever 28 located outside the head plate I upon the outer end of a short rotating shaft 29 which is pivoted in the head plate I and which at its inner end has fastened thereto a C-shaped plate 30. The clutch shifting arm 27 has its upper or outer end as the parts are seen in Fig. 3 securely held in position by a small cap screw 31, the shank of which extends through a hole 32 provided close to this end of said arm 27 and into a threaded hole 33 located upon the recessed inner face 34 of the head plate I. This arm 27 is composed of slightly resilient material so that nowithstanding its outer end is so secured to the head plate the inner end of arm 27 may swing towards and from the said recessed face 34 the required distance to give the proper sliding movement to the sliding clutch member. The inner end 35 of this arm 27 is forked or bifurcated as best appears from the separate plan view thereof as shown in Fig. 6 and this forked end 35 extends into the groove or channel 36 provided when the movable clutch and pinion are integral or when these parts are separate being the space between the outer face of the body of the movable clutch and the inner face of the broad-faced pinion 15. Slightly out from the forked end 35 the arm 27 is provided with two oppositely disposed integral fingers 37 and 38, which fingers are bent or shaped so as to slant in two opposite directions from the general plane of that portion of the arm. As the parts are herein formed and illustrated the finger 38 at the right hand side of the arm as seen in Figs. 3 and 4 projects towards the spool or away from the adjacent head plate I while the other finger 37 projects towards said head plate. As this mechanism is constructed, a slight recess 39 is provided upon the face 34 of the head plate to allow the extreme outward motion of the said shifting arm 27 to be made without bringing the finger 37 into engagement with any part of the head plate.

About midway between the fingers 37 and 38 and the outer end of the arm 27, said arm is provided with an aperture 40 through which may be seen the inner end of the shaft 29 and this hole serves to make the arm 27 more flexible for its swinging movement required to shift the movable clutch. The C-shaped plate 30 as most plainly appears in the separate plan view thereof, Fig. 7 has two extensions 41 and 42 extending to the right and left as seen in Fig. 7 which extensions are provided with cam fingers 43 and 44 respectively extending towards each other in a circle so as to engage respectively the right hand finger 38 on the outside thereof and the left hand finger 37 on the inside thereof when said C-shaped plate is swung the required amount by the manual swinging of the operating lever 28 by the finger or thumb of the user of the reel.

What I claim as new and desire to secure by Letters Patent is:

1. In a fishing reel the combination of a pair of spaced head plates, each with a central interior bearing, a reel-spool having outwardly extending spindles rotatably mounted in said bearings, one of said bearings being the recessed inner end of a stub shaft projecting inwardly from one head plate, a pinion and a movable clutch member mounted on said stub shaft and connected together to rotate on, and to slide longitudinally as a unit upon, said stub shaft, the clutch member being towards the reel spool and there being an annular groove between the movable clutch member and said pinion, a gear always in mesh with said pinion, a shaft revolubly mounted on the same head plate as the said recessed shaft and fixedly carrying at its inner end said gear and having its outer end outside said headplate and there provided with a crank handle, a clutch member fixed upon the reel spool adjacent said movable clutch member and engaged thereby only when the movable clutch member is moved longitudinally towards the fixed member, a clutch-shifting arm having its inner end adapted to swing longitudinally of said hollow shaft and engaging said groove of the movable clutch member, and a C-shaped cam plate adjacent said arm and pivotally mounted on the inner end of a shaft projecting outwardly through the adjacent head plate and there provided with an operating crank lever, one end of the cam plate being directed outwardly and forming a cam adapted to engage the outer face of said shifting arm intermediate its ends and operating to swing the arm and therewith the movable clutch member inwardly on one movement of said operating lever, the other end of the said cam plate being directed inwardly and forming a cam adapted to engage the inner face of said arm and operating to swing the arm and therewith the movable clutch member outwardly on reverse movement of said operating lever.

2. In a free spool fishing reel, the combination of a pair of spaced head plates, a reel spool revolubly mounted therebetween and having fixed on one face a centrally disposed clutch member, a pinion revolubly mounted upon the head plate opposite said fixed clutch member, an axially slidable clutch member adapted to be moved axially into or out of engagement with said fixed clutch member on the spool and at all positions being held to rotate with said pinion, a driving gear always in mesh with said pinion and rotated by means extending without the adjacent head plate, an arm having one end operatively engaging said movable clutch member and adapted to swing longitudinally of the axis of the clutch and having its other end secured to the adjacent head plate and a C-shaped cam plate adjacent said arm and pivotally mounted on the inner end of a shaft projecting outwardly through the adjacent head plate and there provided with an operating crank lever, one end of the cam plate being directed outwardly and forming a cam adapted to engage the outer face of said shifting arm intermediate its ends and operating to swing the arm and therewith the movable clutch member inwardly on one movement of said operating lever, the other end of the said cam plate being directly inwardly and forming a cam adapted to engage the inner face of said arm and operating to swing the arm and therewith the movable clutch member outwardly on reverse movement of said operating lever.

ALEXANDER LAUTERBACH.